US011042900B2

(12) United States Patent
Arneson et al.

(10) Patent No.: US 11,042,900 B2
(45) Date of Patent: Jun. 22, 2021

(54) SYSTEM AND METHOD FOR RANDOMIZATION FOR ROBUST RFID SECURITY

(71) Applicant: Matrics2, Inc., Warba, MN (US)

(72) Inventors: Michael R. Arneson, Warba, MN (US); William R. Bandy, Gambrills, MD (US)

(73) Assignee: Matrics2, Inc., Warba, MN (US)

( * ) Notice: Subject to any disclaimer, the term of this patent is extended or adjusted under 35 U.S.C. 154(b) by 815 days.

(21) Appl. No.: 15/374,889

(22) Filed: Dec. 9, 2016

(65) Prior Publication Data

US 2017/0169471 A1 Jun. 15, 2017

Related U.S. Application Data

(60) Provisional application No. 62/265,972, filed on Dec. 10, 2015.

(51) Int. Cl.
*G06K 19/073* (2006.01)
*G06Q 30/02* (2012.01)
(Continued)

(52) U.S. Cl.
CPC ..... *G06Q 30/0255* (2013.01); *G06K 7/10297* (2013.01); *G06K 19/06028* (2013.01);
(Continued)

(58) Field of Classification Search
CPC .......... G06Q 30/0255; G06Q 30/0277; G06K 19/073; G06K 7/10297; G06K 19/06028; G06K 19/0723; G06K 10/087
See application file for complete search history.

(56) References Cited

U.S. PATENT DOCUMENTS 8,066,181 B2 11/2011 Bishop et al.
8,344,853 B1 1/2013 Warner et al.
(Continued)

FOREIGN PATENT DOCUMENTS

JP 2003-216710 A 7/2003
JP 2005-038100 A 2/2005
(Continued)

OTHER PUBLICATIONS

Lin, "A Cloud-Based Authentication Protocol for RFID Supply Chain Systems", J. Netw Syst Manage 23:978-997) (Year: 2014).*
(Continued)

*Primary Examiner* — Breffni Baggot
(74) *Attorney, Agent, or Firm* — Fiala & Weaver P.L.L.C.

(57) ABSTRACT

Systems, devices, apparatuses, and methods are described for providing robust RFID security and secure targeted information dissemination. Randomized identifiers for RFID tags associated with products for sale are read by readers of user devices having their own randomized identifiers. Information relating to the products is provided to the user devices by information retrieval systems without exposing information related to the user device or a user thereof. Information security is provided through the use of the randomized identifiers that act as proxies or surrogates for users and user devices. Based on the products and associated RFID tags read by the user device, a retailer or manufacturer provides targeted advertising and sales incentives to the user device through the information retrieval system.

7 Claims, 6 Drawing Sheets

(51) Int. Cl.
  *G06K 7/10* (2006.01)
  *G06K 19/06* (2006.01)
  *G06K 19/07* (2006.01)
  *G06Q 10/08* (2012.01)

(52) U.S. Cl.
  CPC ....... *G06K 19/073* (2013.01); *G06K 19/0723* (2013.01); *G06Q 10/087* (2013.01)

(56) References Cited

U.S. PATENT DOCUMENTS

| | | | |
|---|---|---|---|
| 8,892,446 | B2 | 11/2014 | Cheyer et al. |
| 8,942,372 | B2 | 1/2015 | Kaulartz et al. |
| 8,954,035 | B2 | 2/2015 | Ergen |
| 9,024,729 | B1 | 5/2015 | Diorio et al. |
| 9,292,670 | B2 | 3/2016 | Gupta et al. |
| 9,369,342 | B2 | 6/2016 | Dyba et al. |
| 10,098,000 | B2 | 10/2018 | Fan et al. |
| 10,582,359 | B2 | 3/2020 | Arneson et al. |
| 2002/0126013 | A1 | 9/2002 | Bridgelall |
| 2003/0153300 | A1 | 8/2003 | Nakao |
| 2004/0181450 | A1 | 9/2004 | Yamada et al. |
| 2004/0212500 | A1 | 10/2004 | Stilp |
| 2005/0088299 | A1 | 4/2005 | Bandy et al. |
| 2006/0170534 | A1 | 8/2006 | Arneson et al. |
| 2006/0180595 | A1 | 8/2006 | Arneson et al. |
| 2007/0024436 | A1* | 2/2007 | Bandy ................ G06K 17/0022 340/505 |
| 2007/0075128 | A1* | 4/2007 | Hall ........................ G06F 16/27 235/376 |
| 2007/0096882 | A1 | 5/2007 | Bandy et al. |
| 2007/0106897 | A1 | 5/2007 | Kulakowski |
| 2007/0126585 | A1 | 6/2007 | Okunev et al. |
| 2007/0139163 | A1 | 6/2007 | Powell et al. |
| 2007/0202807 | A1 | 8/2007 | Kim |
| 2008/0001724 | A1 | 1/2008 | Soleimani et al. |
| 2008/0029732 | A1 | 2/2008 | Roberts et al. |
| 2008/0136639 | A1 | 6/2008 | Deoalikar et al. |
| 2008/0278325 | A1 | 11/2008 | Zimman et al. |
| 2008/0297326 | A1 | 12/2008 | Chakraborty et al. |
| 2009/0033493 | A1 | 2/2009 | Lin et al. |
| 2011/0154046 | A1 | 6/2011 | Fradet et al. |
| 2011/0154447 | A1 | 6/2011 | Dennis et al. |
| 2012/0266258 | A1 | 10/2012 | Tuchman et al. |
| 2013/0080251 | A1 | 3/2013 | Dempski |
| 2013/0145420 | A1 | 6/2013 | Ting et al. |
| 2013/0181819 | A1 | 7/2013 | Mclaren |
| 2014/0089196 | A1 | 3/2014 | Paya et al. |
| 2014/0169566 | A1 | 6/2014 | Baranowski |
| 2015/0106871 | A1 | 4/2015 | Lim |
| 2015/0108211 | A1 | 4/2015 | Higgins et al. |
| 2015/0143128 | A1 | 5/2015 | Goodman |
| 2015/0242842 | A1 | 8/2015 | Piva et al. |
| 2015/0248393 | A1 | 9/2015 | Watanabe |
| 2015/0294214 | A1 | 10/2015 | Boulby |
| 2015/0348056 | A1 | 12/2015 | Surapaneni |
| 2016/0013090 | A1 | 1/2016 | Arneson et al. |
| 2016/0188920 | A1 | 6/2016 | Kelly et al. |
| 2016/0210547 | A1 | 7/2016 | Dekeyser et al. |
| 2017/0032382 | A1* | 2/2017 | Shulman ................ G06Q 30/06 |
| 2017/0257733 | A1 | 9/2017 | Arneson et al. |
| 2018/0096175 | A1 | 4/2018 | Schmeling et al. |
| 2018/0173896 | A1 | 6/2018 | Arneson et al. |

FOREIGN PATENT DOCUMENTS

| | | |
|---|---|---|
| KR | 10-2012-0116191 A | 10/2012 |
| WO | 2008050312 A2 | 5/2008 |
| WO | 2017/100694 A1 | 6/2017 |
| WO | 2017155988 A1 | 9/2017 |
| WO | 2018112381 A1 | 6/2018 |

OTHER PUBLICATIONS

Dong, et al., "Cloud-Based RFID Mutual Authentication Protocol without Leaking Location Privacy to the Cloud", International Journal of Distributed Sensor Networks, vol. 2015, Article ID 937198, 2015, pp. 1-9.

International Search Report and Written Opinion received for PCT Patent Application No. PCT/US2016/065999, dated Mar. 3, 2017, 7 pages.

International Search Report and Written Opinion received for PCT Patent Application No. PCT/US2016/065999, dated May 19, 2017, 8 pages.

Extended European Search Report received for EP Patent Application No. 16874002.5 dated May 28, 2019, 12 pages.

International Search Report and Written Opinion received for PCT Application No. PCT/US17/066753, dated Feb. 16, 2018, 14 pages.

Arneson et al., "Randomization: Another Approach to Robust RFID Security", Chapter 22 from the book "RFID Applications, Security, and Privacy," published by Addison Wesley, 2006, 6 pages.

International Preliminary Report on Patentability and Written Opinion received for PCT Application No. PCT/US2017/066753, dated Jun. 27, 2019, 8 pages.

International Search Report and Written Opinion received for PCT Patent Application Serial No. PCT/US2017/021146, dated May 25, 2017, 17 pages.

* cited by examiner

US 11,042,900 B2

SYSTEM AND METHOD FOR RANDOMIZATION FOR ROBUST RFID SECURITY

CROSS-REFERENCE TO RELATED APPLICATIONS

The instant application claims priority to U.S. Provisional Patent Application No. 62/265,972, entitled "Randomization Approach to Robust RFID Security," filed on Dec. 10, 2015, the entirety of which is incorporated herein by reference.

The instant application is related to U.S. patent application Ser. No. 14/795,771, entitled "Integrated Circuit Controlled Ejection System (ICCES) for Massively Parallel Integrated Circuit Assembly (MPICA)," filed on Jul. 9, 2015, the entirety of which is incorporated herein by reference.

BACKGROUND

I. Technical Field

Embodiments described herein relate to radio-frequency identification (RFID) security.

II. Background Art

The greatest direct marketing opportunity today is translating the mouse click on an item of interest on a shopping web site, which generates direct, targeting marketing to the consumer, into the brick and mortar stores which are now dominated by the less effective and much more costly blanket marketing.

BRIEF SUMMARY

Methods, systems, devices, and apparatuses are described for randomizations to improve RFID security, substantially as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Embodiments will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

Figure 1:
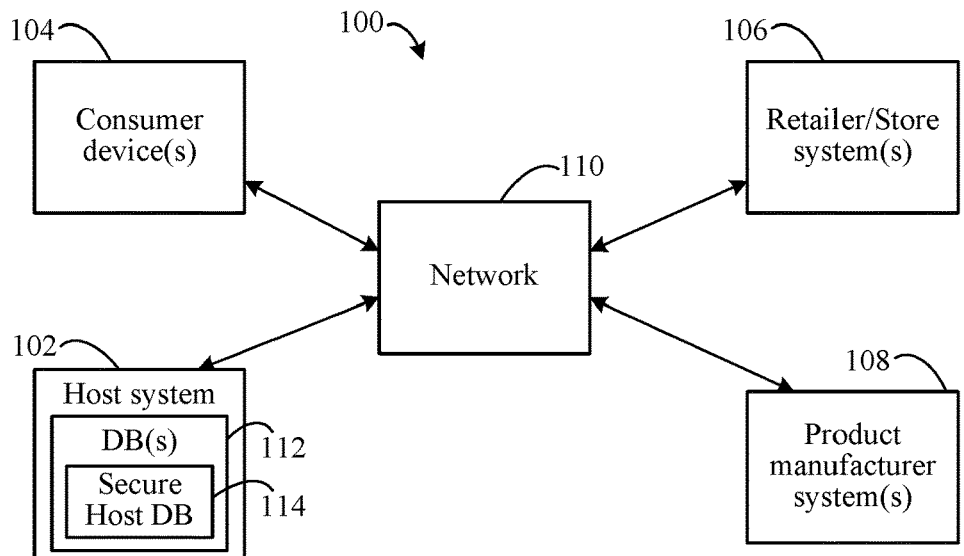
FIG. 1 shows a block diagram of a system, according to an example embodiment.

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Still further, it should be noted that the drawings/figures are not drawn to scale unless otherwise noted herein.

As used herein an identifier may be referred to as an "ID" and radio-frequency identification may be referred to as an "RFID" unless explicitly stated otherwise.

Numerous exemplary embodiments are now described. Any section/subsection headings provided herein are not intended to be limiting. Embodiments are described throughout this document, and any type of embodiment may be included under any section/subsection. Furthermore, it is contemplated that the disclosed embodiments may be combined with each other in any manner. That is, the embodiments described herein are not mutually exclusive of each other and may be practiced and/or implemented alone, or in any combination.

II. Example Embodiments

The example techniques and embodiments described herein may be adapted to various types of systems and devices, for example but without limitation, server computers including distributed systems, personal computers and laptops, tablet computers, communication devices (e.g., cellular and smart phones), personal digital assistant (PDA) devices or personal assistant (PA) devices, portable music players, handheld gaming devices and gaming consoles, televisions and smart televisions, and/or the like. While the embodiments herein may be described with respect to PDA devices or PA devices utilizing Smart Phone Readers (SPRs) and servers/server systems as conceptual and/or illustrative examples for descriptive consistency, other types of implementations are also contemplated for performing and utilizing the disclosed techniques. It is contemplated herein that in various embodiments and with respect to the illustrated figures of this disclosure, one or more components described and/or shown may not be included and that additional components may be included.

The techniques described herein provide novel systems, methods, and devices, for improved RFID security, e.g., using randomization techniques, that allows consumers of goods, e.g., customers, to receive product information and targeted advertising, including special offers and coupons or discounts. The described techniques and embodiments provide for robust protection of consumer identities and using novel approaches for information exchange utilizing randomization. That is, the embodiments and techniques herein provide a secure database approach using RFID tags that are associated with products and then also with consumers. Some embodiments are based on the Matrics2 Random Number Identification (RNID) Near Field Communication (NFC) High Frequency (HF) Radio Frequency (RF) tag from Matrics2, Inc. of Grand Rapids, Minn., which is chosen for its security, simplicity, low cost, and low power. This tag was first introduced by Matrics, Inc. of Columbia, Md., as an EPC Class 0 tag. 1. Further details regarding the operation of this tag may be found in "Randomization: Another Approach to Robust RFID Security," by Michael R. Arneson and William Bandy, Chapter 22, from the book entitled "RFID Applications, Security, and Privacy," published by Addison Wesley (2006), with the entirety of this chapter incorporated by reference herein.

For example, the techniques and embodiments described herein provide the ability to alleviate or eliminate obstacles associated with blanket advertising by implementing and utilizing a unique random number identifier ID (RNID) database used as a gateway with RNID Near Field Communication (MNFC) tags read by NFC read-enabled Smart Phone Readers (SPRs), and/or the like, controlled by a Matrics2 application (MAPP). This approach envisions a world where every item/product, e.g., items/products for sale at stores, large or small, has an RNID MNFC tag, e.g., under the barcode label of the item/product (although alternative product-unique identifiers are contemplated herein). Accordingly, the tap of the consumer SPR to that MNFC tag label becomes the equivalent to a mouse click online, where consumer interest can be captured for direct, targeted marketing. In embodiments, references to Matrics2 refer to an exemplary host entity.

The Matrics2 RNID database (MDB), which may include one or more host servers, cloud-implemented components, and/or other host components/infrastructure in embodiments, provides the gateway to make this vision a reality. The MDB ecosystem creates a "currency" of exchanging a RNID "surrogate" for the consumer to manufacture and retail store databases for the product barcode, which is used by the MAPP to provide product information to the consumer. This RNID surrogate is then used to send direct, targeted advertising to the consumer, by sending the surrogate RNID to the MDB with the advertising information.

The surrogate RNID is then used with the associated consumer contact information stored in the MDB to forward the information on to the consumer, through the MAPP, email, text messaging, and/or the like. No consumer information is revealed outside the MDB for this transaction. For every advertisement sent to a consumer, the host may extract a small fee, generating revenue for providing this advertising gateway to the manufacturers and retail stores. In other words, a mouse click and a SPR tap are now the same.

FIG. 1 shows a block diagram of a system 100, according to an embodiment. One or more components of system 100 may be configured to perform the techniques described above. System 100 includes a host system 102, one or more consumer devices 104 (consumer device(s)), one or more retailer systems 106 (retailer system(s)), and one or more product manufacturer systems 108 (manufacturer system(s)) which are communicatively connected via a network 110. Host system 102 may include one or more databases 112 (database(s) or DB(s)).

In embodiments, one or more of host system 102, consumer device(s) 104, retailer system(s) 106, and product manufacturer system(s) 108 may be centrally located or may be distributed systems having one or more of respective components located at one or more geographic locations, and may be implemented as hardware, firmware, and software, or any combination thereof.

Consumer device(s) 104 may be personal computers and laptops, tablet computers, communication devices (e.g., cellular and smart phones), PDA devices, PA devices, etc., as described herein. In embodiments, consumer device(s) 104 are configured to read RF information from tags associated with products/items as described herein, using an NFC reader or other equivalent component.

Retailer system(s) 106 may comprise stores (e.g., point of sale locations) and systems thereof, database servers, advertisement management systems, communication components, networks of the retailer(s), and/or the like.

Product manufacturer system(s) 108 may comprise manufacturing facilities and systems thereof, database servers, advertisement management systems, communication components, networks of the manufacturer(s), and/or the like. In embodiments, a manufacturer system(s) 108 may also be, or may be instead, a distributor system(s).

Network 110 may comprise one or more networks such as LANs, WANs, enterprise networks, the Internet, etc., and may include one or more of wired and/or wireless portions. While shown as being the central hub through which communication traffic flows in system 100 of FIG. 1, it is contemplated that other connections and network configurations may be implemented in embodiments, such as but without limitation, direct connections between two or more entities, utilizing telecommunication networks, point-to-point connections, etc.

Host system 102 may comprise tag manufacturing and/or programming facilities and systems thereof, database servers, administration systems, communication components, internal networks of the host, and/or the like. For example, host system 102 may include one or more servers or computing devices configured to perform functions associated with the techniques and embodiments described herein. Host system 102 may include DB(s) 112 which are configured to store one or more of unique RNID's for distribution in tags, manufacture and retail store database information such as products, product identifiers, barcodes, QR codes, etc., consumer database information such as identifiers, products purchased, links of consumer information to product information, etc., and/or the like, as described herein. DB(s) 112 are configured to link a unique random-number product ID of a NFC high frequency RF tag associated with a product (e.g., an item for sale) to a unique random-number ID of a special customer database or customer database CDB, e.g., of product manufacturer system(s) 108, in embodiments. DB(s) 112 may comprise one or more servers or computing devices for storing data associated with DB(s) 112, and may be secure databases according to embodiments, including a secure host database 114.

Host system 102 is configured to receive information from a user device, e.g., a unique random-number device ID, contact/identification information of a user of the user device, a unique random-number product ID, associated with a product/item, read by the user device, and/or the like, as described. DB(s) 112 are configured to link or associate the product ID with a CDB in order to retrieve product/item information therefrom, and to provide the retrieved information to the user device and/or to the user. The retrieved information may be one or more types of information of a product/item described herein, including advertisement information, coupon/discount information, availability information and/or location information for products/items, descriptions, specifications, use instructions, warranties, etc.

Accordingly, the techniques and embodiments described herein provide for improvements in RFID security as described above, including but not limited to utilizing randomization.

For instance, methods, systems, devices, and apparatuses are provided for improved RFID security. A system in accordance with an example aspect is described. In one aspect, the system is a product information retrieval system that comprises one or more host servers. The one or more host servers are configured to, in a secure host database, link a unique random-number product identifier (ID) of a near field communication (NFC) high frequency radio frequency (RF) tag (MNFC tag) associated with a product to a unique random-number ID of a (CDB), and from a user device that has a unique random-number device ID and that is configured to read the unique random-number product ID from the MNFC tag, receive the unique random-number product ID and the unique random-number device ID. The one or more host servers are also configured to provide the unique random-number product ID and the unique random-number device ID to the CDB, based on a query against a secure host database for the unique random-number ID of the CDB, receive information related to the product, a pre-determined product ID, and the unique random-number device ID from the CDB, and provide at least one of the information related to the product or the pre-determined product ID to the user device based on at least one of the unique random-number device ID of the user device or contact information associated with the user device.

Various example embodiments are described in the following subsections. In particular, example embodiments are described, and this description is followed by further example embodiments and advantages. Subsequently an example computing device implementation is described. Finally, some concluding remarks are provided. It is noted that the division of the following description generally into subsections is provided for ease of illustration, and it is to be understood that any type of embodiment may be described in any subsection.

III. Example Embodiments

As noted above, systems and devices for robust RFID security, along with their components as exemplarily described with respect to FIG. 1 and elsewhere in the preceding Section, may be configured in various ways to provide RFID security through randomization and secure data storage as well as to provide consumers/customers with additional information regarding items/products.

In embodiments, by way of illustrative example and not limitation, a random number generator is used to create the RNID's, so that each is unique and there are no duplicates. For example a 64 bit RNID provides 18 million trillion different unique numbers, enough to provide 22 trillion tags per year for almost a million years without duplicating a number. The number is laser programmed into a Read Only Memory (ROM) on a Matrics2 tag chip using laser fuse technology after the chip is fabricated and is still at the wafer level. Then the programmed chip wafer is attached to the Matrics2 Massively Parallel Chip Assembly (M-PICA) push plate and laser scribed so that the chips (over one million of them on a 12 inch silicon wafer) can be pushed onto an underlying antenna substrate to create the NFC tags, each with its own unique RNID. Further detail regarding M-PICA process is found in U.S. patent application Ser. No. 14/795,771, entitled "Integrated Circuit Controlled Ejection System (ICCES) for Massively Parallel Integrated Circuit Assembly (MPICA)," filed on Jul. 9, 2015, the entirety of which is incorporated herein by reference.

The Matrics2 NFC (MNFC) RNID tags (the MNFC tags) are configured to be read by NFC reader-enabled smart phones, such as but not limited to Android phones, iPhone 6 or 7, and/or the like, also referred to as Smart Phone Readers (SPRs) herein. A Matrics2 SPR Application (e.g., the MAPP) is downloaded onto the SPR to enable the SPR to read MNFC tags. When downloaded onto an SPR, a RNID will be assigned to that particular MAPP, designated by RNIDA or a unique random-number device ID, for identification in the Matrics2 Database (MDB). Also, on downloading, the MAPP is configured to gather and or obtain from the SPR relevant user and SPR information relevant to the use of the MAPP in reading MNFC tags and presenting information to the user (e.g., user/consumer/customer identification information, contact information for phone, email, text, a media access control (MAC) address of the SPR, etc., address(es), friend information, and/or the like). This user and SPR information will be associated with the MAPP RNIDA in the MDB, but is used only to route information to the user. It is never shared or revealed outside the MDB. The MAPP RNIDA serves as a surrogate persona for the user in the MDB "ecosystem" as further explained below.

Figure 2:
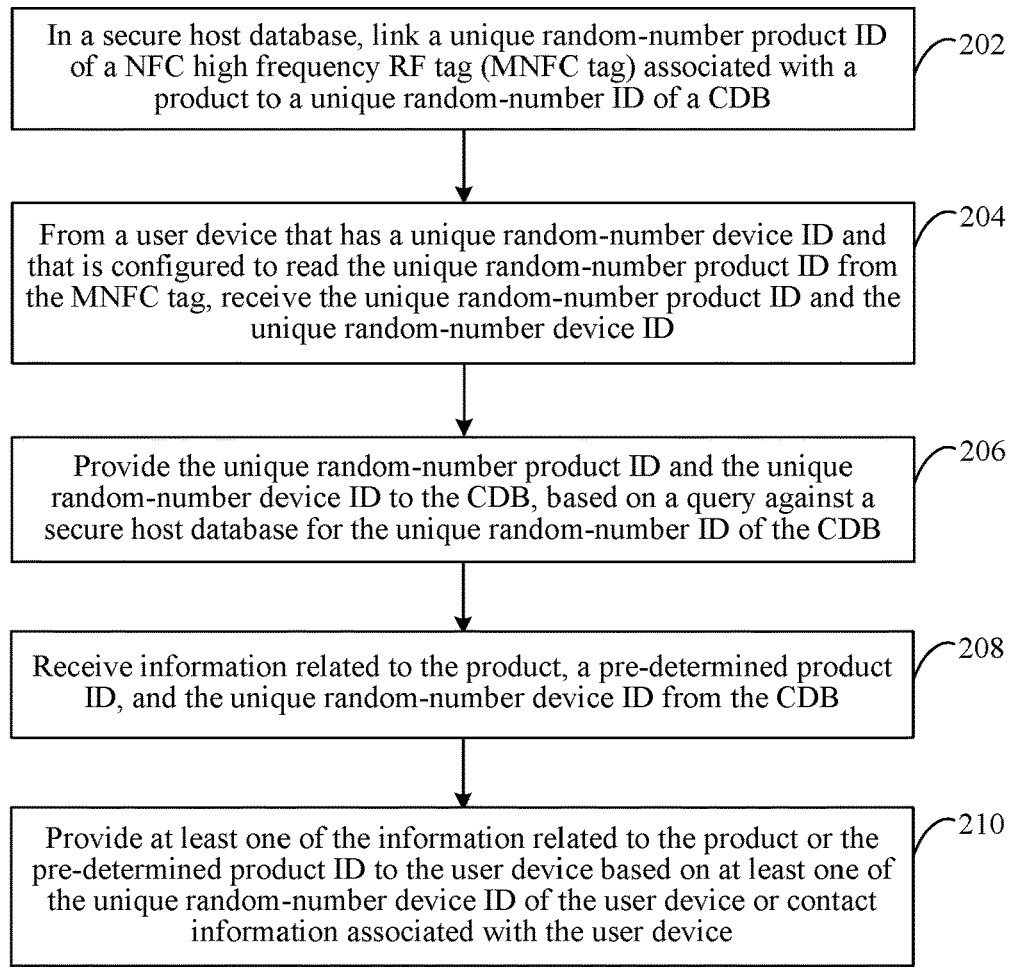
FIG. 2 shows a flowchart for providing robust RFID security and secure targeted information provision by the system of FIG. 3, according to an example embodiment.

Referring to FIG. 2, a flowchart 200 for improved RFID security and information dissemination by a host server(s), e.g., host server(s) 102 of FIG. 1 or an MDB system and communicatively coupled components as in FIG. 3 described below, is shown, according to an embodiment. That is, a host server(s) as described herein, along with any respective subcomponents thereof, may be configured to perform their respective functions in accordance with flowchart 200.

Figure 3:
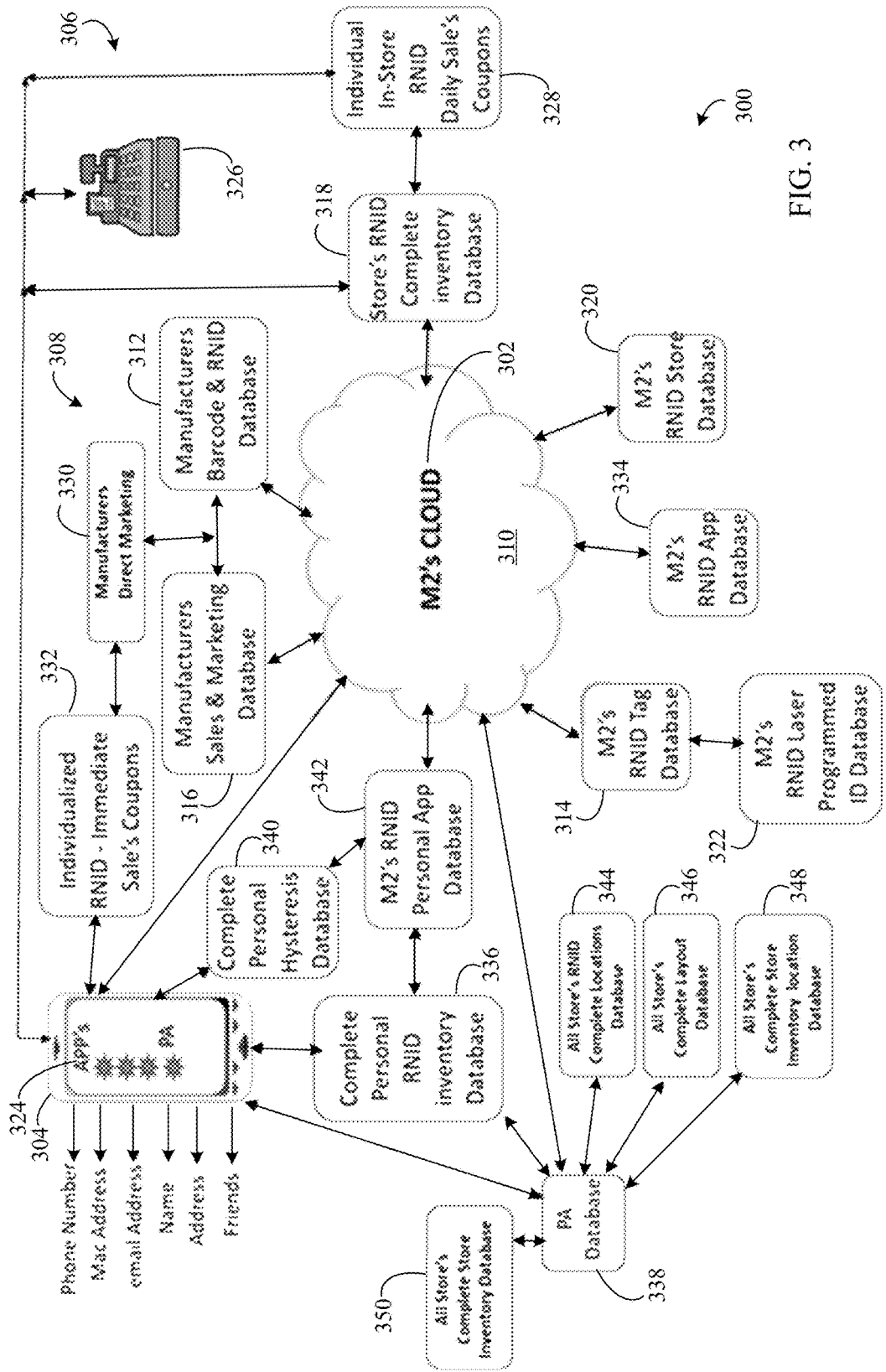
FIG. 3 shows a block diagram of a system, according to an example embodiment.

Referring also to FIG. 3, a block diagram of an MDB system and communicatively coupled components 300 ("system 300") is shown, according to an embodiment. System 300 may be a further embodiment of system 100 of FIG. 1, including subsystems/components thereof. For example, system 300 includes a host system 302 illustrated as being a cloud-based implementation in a network 310, one or more user devices 304 (or consumer device(s) or SPR), one or more retailer systems 306 (retailer system(s)), and one or more product manufacturer systems 308 (manufacturer system(s)).

Flowchart 200 is described as follows with respect to system 300 and host system 302 therein.

In a secure host database, e.g., secure host database 114 of FIG. 1, a unique random-number product identifier (ID) of a near field communication (NFC) high frequency radio frequency (RF) tag (MNFC tag) associated with a product is linked to a unique random-number ID of a customer database (CDB) (202). For instance, Matrics2 product manufacture customers and distribution centers (MC's) who buy MNFC tags for application to their products are each assigned a RNID, designated by RNIDC or a unique random-number ID of a DB 312 which is part of manufacturer system(s) 308. When an MC buys a batch of MNFC tags the RNID's for these tags, designated as RNIDP or a unique random-number product ID, are associated with the RNIDC of that MC in the MDB in a DB 314 which is part of host system 302. Also associated with the MC RNIDC is a link address, or pointer, such as a URL, stored in a special customer database (CDB) 316, which is part of manufacturer system(s) 308, that links MNFC RNIDP tags with the barcode information (also referred to herein as a pre-determined product ID) for the products the MNFC tags are attached to. As noted above, a random number generator is used to create the RNID's, which may be stored in a DB 322, which is part of host system 302.

When a retailer desires to be part of the MNFC tag/product/consumer process, they go to the Matrics2 website and enroll their company. They will be prompted to provide their store name, location (including GPS coordinates if known, or they will be retrieved based on the address), and a link address, or pointer, such as a URL, for an associated store product database (SDB) 318. They will be assigned a RNID, designated as RNIDS or a unique random-number store ID, which will be linked to this data in the MDB in a DB 320 which is part of host system 302. Sent also is the MDB link address for the store to use to communicate with the MDB.

From a user device that has a unique random-number device ID and that is configured to read the unique random-number product ID from the MNFC tag, the unique random-number product ID and the unique random-number device ID are received (204). For instance, when a consumer is ready for shopping, a Matrics2 MAPP 324 is selected on the SPR (i.e., user device(s) 304), which establishes a wireless connection between SPR 304 and the MDB. MAPP 324 starts monitoring GPS location data looking for coordinate matches within a small range in the MDB. If an enrolled store 326 is in range, MAPP 324 will retrieve the store's link address associated with the GPS coordinates in the MDB and also the store's RNIDS. MAPP 324 is configured to use the link to send the store's RNIDS out to SDB 318 to authenticate a request from MAPP 324 for sales or other information to display on the shopper's SPR 304. The MAPP RNIDA, stored in a DB 334 which is also a part of host system 302, may also be sent to retrieve special coupons or sales offers for that particular consumer based on past shopping history in store 326, e.g., via a DB 328 which is part of retailer system(s) 306.

The MAPP RNIDA could be retained in SDB 318 to send targeted advertising to the MAPP RNIDA at any time. This is accomplished by the store 326 connecting to the MDB using its RNIDS to authenticate store 326, and sending the RNIDA along with the advertisement. The MDB then retrieves user information associated with the RNIDA to send the advertisement to the user's MAPP for display on the user's SPR, to the user's email address, as text message, or in any other fashion specified and allowed from the user data. In this way, no user information is exposed outside the MDB. RNIDS's could be retained as part of user data in the MDB for "pull" advertisements described later.

The consumer could also use MAPP 324 to pull down a list of enrolled stores 326 within a specified distance from the user, and MAPP 324 would as above inquire about sales and coupons from each store 326 on the list in turn and display the information on the user's SPR 304. In this way a consumer could plan a shopping trip to various stores 326 based on best price information. In embodiments, product information related to store 326 may be received by user device(s) 304 (SPR 304) and/or stored in one or more of a store location DB 344, a store layout DB 346, a store inventory layout DB 348, and a store inventory DB 350 that are associated with a store-related personal assistant database (PADB) 338 accessible by user device(s) 304 (SPR 304) which may be accessed by the Personal Assistant Software Entity (PASE) described below with respect to FIG. 5.

When the consumer taps a product MNFC tag, e.g., at store 326 or retailer location, with their SPR 304, the tag RNIDP is sent to the MDB, retrieving the manufacturer data link, or URL, associated with that tag RNIDP.

The unique random-number product ID and the unique random-number device ID are provided to the CDB, based on a query against a secure host database, e.g., secure host database 114 of FIG. 1, for the unique random-number ID of the CDB (206). For example, the tag RNIDP is also sent to CDB 316 from the MDB along with the retrieved RNIDC to authenticate the retrieval request for the product barcode and other product information associated with that tag RNIDP in CDB 318, such as manufacture sales and coupons for that product. Also sent is the MAPP RNIDA that can be retained by the manufacturer's CDB 318 for customized, targeted advertising to that MAPP RNIDA as described below, e.g., via a direct marketing component 330 and a DB 332, which are part of manufacturer system(s) 308.

Information related to the product, a pre-determined product ID, and the unique random-number device ID are received from the CDB (208). When the product barcode (pre-determined product ID) and other product information associated with the product's MNFC tag are retrieved by the MDB from CDB 316, this data is then provided to MAPP 324. For example, at least one of the information related to the product or the pre-determined product ID are provided to the user device based on at least one of the unique random-number device ID of the user device or contact information associated with the user device (210). MAPP 324 is configured to send this data to SDB 318 along with the store's RNIDS to authenticate the retrieval request for additional product information, pricing, and any sale coupons for that product. This product data, with any coupons, is displayed by MAPP 324 on user device(s) 304. In embodiments, MAPP 324 may be configured to store the unique random-number product ID (RNIDPs) associated with products for which product data is received, or for which the unique random-number product ID is read, in a RNID inventory DB 336 related to user device(s) 304. The contents of RNID inventory DB 336 may also be stored by the MDB in a personal application database (PDB) 342 associated with host system 302. The MAPP RNIDA may also be sent to obtain any sales offers for that particular consumer as noted herein. Again, SDB 318 could retain the MAPP RNIDA for customized, targeted advertising as described above. If the customer hits a MAPP 324 "buy" button, this buy signal is sent to SDB 318 for processing through the automated checkout process and for automatic decrement of store inventory in SDB 318.

Figure 4:
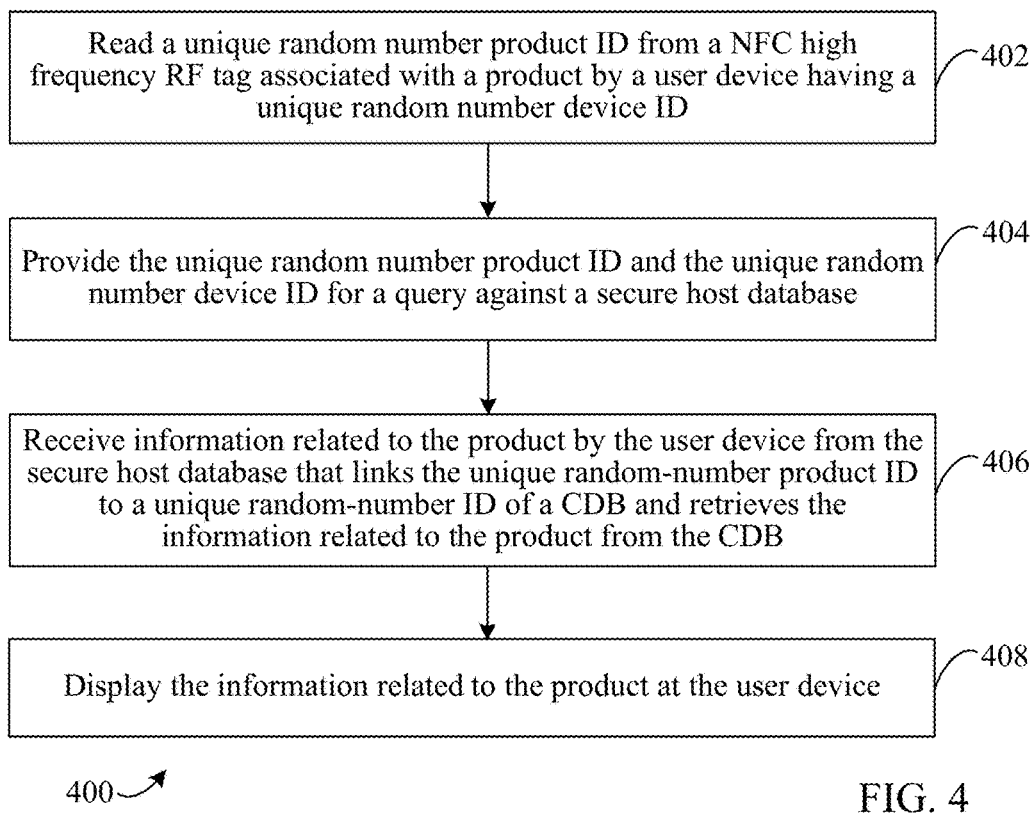
FIG. 4 shows a flowchart for providing robust RFID security and secure targeted information provision by the system of FIG. 3, according to an example embodiment.

Turning to FIG. 4, a flowchart 400 for improved RFID security and information dissemination by a host server(s), e.g., host server(s) 102 of FIG. 1 or an MDB system and communicatively coupled components as in FIG. 3, to a user device(s), e.g., user device(s) 104 of FIG. 1 or user device(s) 304 of FIG. 3, described above, is shown, according to an embodiment. That is, a user device(s) communicating with a host server(s) as described herein, along with any respective subcomponents thereof, may be configured to perform their respective functions in accordance with flowchart 400. Flowchart 400 is described as follows with respect to FIG. 3 and user device(s) 304.

A unique random number product ID is read from a NFC high frequency RF tag associated with a product by a user device having a unique random number device ID (402). User device(s) 304, or SPRs 304, are configured to read MNFC tags associated with products or items for sale, e.g., by reading a tag embedded in or under a barcode of the product, or in or on the packaging of the product.

The unique random number product ID and the unique random number device ID are provided for a query against a secure host database (404). For instance, as noted above the MDB, e.g., an embodiment of secure host database 114 of FIG. 1, may receive a unique random number product ID is read from MNFC tags associated with products by user device(s) 304. User device(s) 304 are configured to provide this data to the MDB, e.g., using MAPP 324 executing on user device(s) 304.

Information related to the product is received by the user device from the secure host database that links the unique random-number product ID to a unique random-number ID of a CDB and retrieves the information related to the product from the CDB (406). For example, again as noted above, the MDB, e.g., an embodiment of secure host database 114 of FIG. 1, and associated components and databases of system 300, are configured to provide information related to products (whose MNFC tags are read by user device(s) 304) which is received by user device(s) 304.

The information related to the product is displayed at the user device (408). User device(s) 304 are configured to display product information received by the MDB, e.g., via MAPP 324 executing on user device(s) 304, via emails, via texts, via calendar appointments, and/or the like, using a display component of user device(s) 304.

The MAPP RNIDA could be retained in SDB 318 to send targeted advertising to the MAPP RNIDA at any time. This is accomplished by store 326 connecting to the MDB using its RNIDS to authenticate the store, and sending the RNIDA along with the advertisement. The MDB then retrieves user information associated with the RNIDA to send the advertisement to the user's MAPP 324 for display on the user's SPR 304, to the user's email address, as text message, and/or in any other fashion specified and allowed from the user data and information. In this way, no user information is exposed outside the MDB. RNIDS's could be retained as part of user data in the MDB for "pull" advertisements described herein.

The consumer could also use MAPP 324 to pull down a list of enrolled stores 326 within a specified distance from the user, and MAPP 324 would as above inquire about sales and coupons from each store 326 on the list in turn and display the information on the user's SPR 304. In this way, a consumer could plan a shopping trip to various stores based on best price information.

At any time a product manufacturer(s) may send out targeted, customized advertising to stored MAPP RNIDA's. This is accomplished by the manufacturer connecting to the MDB using its RNIDC to authenticate the manufacturer, and sending the RNIDA along with the advertisement. The MDB then retrieves user information associated with the RNIDA to send the advertisement to the user's MAPP 324 for display on the user's SPR 302, to the user's email address, as a text message, and/or in any other fashion specified and allowed from the user data and information. Advertisements could be customized according to consumer shopping history tracked by their MAPP RNIDS. No consumer information is needed in this process, only their MAPP RNIDA's. RNIDC's could be retained as part of user data in the MDB for "pull" advertisements as described herein.

When a user purchases an MNFC tagged product, the tag could be read by a checkout MNFC reader, e.g., at store 326, which moves the item into a purchased state in SDB 318 that associates the MAPP RNIDA information with the product RNIDP. This information could be used for product returns and/or repair, or other actions where the product can be quickly verified as being legitimately owned by the user by reading the tag and retrieving the purchased information from SDB 318, which would include the stored MAPP RNIDA to authenticate the consumer.

If the purchased product is bought at store 326, but is delivered from a store warehouse or distribution center (DC), such as for large appliances, there will be no MNFC tag to read at checkout to move the product into the purchased state as described above. The product may be moved into the "purchased and delivered" state upon delivery where the delivery is confirmed according to embodiments. There are many ways to achieve this, all of which fall under the scope of the disclosed embodiments and techniques.

In one embodiment, at the time of purchase the DC receives electronic verification that a specific product was purchased and needs to be pulled from stock or ordered for a specific customer for home delivery. At that time, a barcode, or other pre-determined product ID, is printed with an MNFC enabled tag. These credentials are sent to the store's database (e.g., SDB 318 or another DB) and are linked to the customer's purchasing information. The credentials are placed onto the product and into the ready to deliver state in the database for a date predetermined at time of purchase. Once the delivery arrives at the customer's home, the delivery driver's MNFC read-only enabled reader scans the tag allowing the customer to digitally sign for the product. At that time the product will be put into the purchased state. At that time the customer can also scan the tag data into their PADB 338 and/or into PDB 342, as described herein.

In another embodiment, upon purchase at checkout at store 326, an electronic receipt, which includes a unique RNID confirmation number along with a response Internet address, may be sent by email to the purchaser, or via other mode of communication/notification as described herein. This confirmation number is also held in a "purchased but not delivered" database of store 326. When the product is delivered and unpacked, the customer taps their reader to the MNFC tag on the product. MAPP 324 sends the tag RNIDP to the product database (e.g., SDB 318), pulls up the product description and prompts the user "Is this your expected delivery?" or other equivalent prompt. Upon confirmation from the user, MAPP 324 sends the confirmation number and the tag's RNIDP to the response Internet address, which accesses the store's "purchased but not delivered" database, whereupon confirming a match with the confirmation number, accesses the RNIDP in the product database and moves it into the purchased state attaching the user MAPP RNIDA identification information.

User device(s) 304 (PDR 304) is also configured to access and store past shopping history information of a consumer in a personal hysteresis DB 340, according to embodiments.

Figure 5:
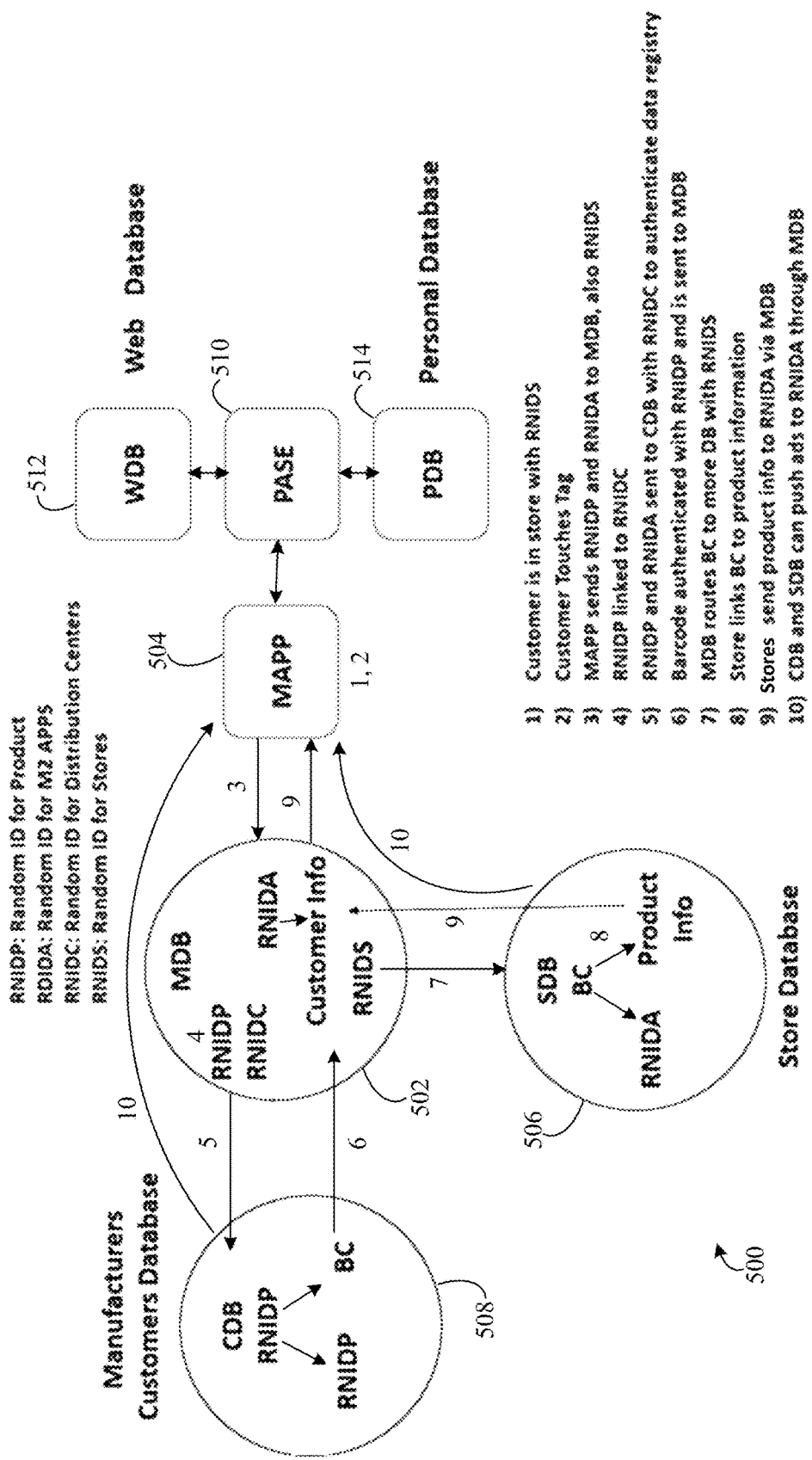
FIG. 5 shows a block diagram flow of the operation of a system, according to an example embodiment.

Referring now to FIG. 5, a block diagram flow of the operation of a system 500 is shown, according to an embodiment. System 500 may be a further embodiment of system 100 of FIG. 1 and/or system 300 of FIG. 3, including respective subsystems/components thereof. For example, system 500 includes an MDB/host system 502, a user device 504 (consumer device(s) or SPR(s) 504), a retailer system 506 (retailer system(s)), and a product manufacturer system 508 (manufacturer system(s)). System 500 also includes Personal Assistant Software Entity (PASE) 510, a personal DB 514, and a web DB(s) 512.

In the illustrated embodiment, user device 504 includes a MAPP configured to be executed by user device 504. Additionally, the components of system 500 may be configured to communicate with each other as illustrated over one or more networks (not shown for illustrative clarity and brevity), or over any additional connections therebetween.

SPR 504, e.g., via the MAPP, may be configured to interact with a Personal Assistant Software Entity (PASE) 510 application residing on the SPR 504, or residing on a remote server accessed via another application on SPR 504, to enhance the user experience. For example, when the MAPP retrieves the product barcode from the CDB 316 as described above with respect to FIG. 3, the MAPP is configured to pass the barcode to PASE 510, which is configured to then perform a web search to access other multiple on-line databases, e.g., web DB(s) 512, for additional product information, such as product description, specifications, instructions for use, warranties, etc., and to present the information to the user in a relevant actionable manner, e.g., as described herein. The product information thus obtained could then be stored in user PDB 514 (which may be a further embodiment of PDB 342 of FIG. 3) that may be controlled and managed by PASE 510 for later use and reference by the user. The user could use the obtained product information to either buy or not buy the product. The user could also obtain more information about the product or related products with queries through PASE 510 to the tag and gleaned product databases, and/or from retailer databases, as described herein.

From the product data gleaned from the MNFC tags and subsequently stored in user's PDB 514, PASE 510 may obtain information associated with everything the user/consumer has ever purchased having an MNFC tag, including the car he/she drives and what is in his/her house, such as the refrigerator and its contents, microwave, stove, oven, washer and dryer, products in the pantry or freezer, clothing, electronics, small appliances, etc., as well as and how to interface with PASEs 510 embedded in purchased home electronics and control systems. PASE 510 may also obtain information associated with the medications the user/consumer is taking, and when they need to be re-ordered; additionally, PASE 510 is configured to re-order medications at a pre-determined time or a time set by the user/consumer. PASE 510 may be configured track a consumer's diet, food she the consumer is trying to avoid, and/or any food allergies she may have. Once the consumer uses any grocery item and reads its associated tag with SPR 304 before discarding the container or wrapper, PASE 510 is configured to put the item into category of PDB 514 entitled "possible shopping list" or the like. When a user/customer prompts PASE 510 for suggestions on what to cook for dinner, breakfast, or lunch, PASE 510 is configured to provide tell the user/consumer what he/she might like to make from the food items currently listed in PDB 514 and informs the user/consumer when it is time to go to the grocery store to replenish. When shopping, PASE 510 is configured to inform the user/consumer of any interactions of over-the-counter NFC tagged medications that interact with prescription medications currently being taken, as well as alert the user/consumer to any NFC tagged food products containing ingredients associated with any food allergies the user/consumer might have or is otherwise trying to avoid. When the user/consumer taps SPR 304 to an MNFC tag attached to a product, such as for example, a bottle of vitamins, the MAPP on SPR 504 is configured to pass the retrieved barcode to PASE 510 which would search health related databases for adverse reactions to the user, and display a warning if any are found.

PASE 510 may also be configured to serve as the intermediary between the MAPP executing on SPR 504 and the user for directed advertisements coming in from product manufactures and/or retail stores based on the MAPP RNIDA stored in those databases with a shopping history associated with the MAPP RNIDA. The MAPP is configured to pass these advertisements to PASE 510, which would screen them for display to the user, e.g., based on the likes and dislikes of the user. As well as screening this "push" advertising, PASE 510 may be configured to "pull" advertising to the user based on a user request for sales coupons or other advertising specials. The user may prompt PASE 510 for any special sales of a product the user is interested in purchasing. PASE 510 may be configured to take one or more of two actions. The first would be to search on-line websites and databases for general public sales advertisements and present any results to the user. Secondly, PASE 510 may be configured to pass the product description to the MAPP, which would connect to MDB 502 to retrieve RNIDC's and RNIDS's stored as part of user data, and the link data associated with therewith, to send the MAPP RNIDA to the associated CDBs 508 and SDBs 506 with the product description for targeted sales advertisements. If any, that information would be sent to the MAPP and passed on to PASE 510 for display to the user/consumer via SPR 504. The result is that specific product and sales information is provided to an individual via a personal device when and where it is wanted.

Tagged products can be further interacted with after purchase. PDB 514 could be augmented with further information about the products, such as location, downloaded manuals and instructions, etc., as described herein. PASE 510 may be configured to access PDB 514 for information, for example, to interface with other PASEs embedded in control and sensor systems, such as for home automation, entertainment systems, home security and smart appliances.

If a product is later sold to another person, the PASEs of both seller and purchaser could communicate with each other to transfer all relevant product information from the seller's PDB to the buyer's PDB, by sending a secure message to the product database to change the name of the person associated with the product.

Further, if a private individual, retailer, or small business desired to apply barcode enabled MNFC RNID label(s) to any item(s) or product(s) that did not already have a pre-existing identification label, they could create one themselves through PASE 510 as follows. An individual would describe the product(s) or item(s) into to their PASE 510 which would translate that verbal or written description into a proper barcode format and then send that information out to either any authorized/approved local home or remote printer/facility that has barcode label feedstock with authorized embedded MNFC RNID tags. For example, the printer could be located at an office supply store, which would print the labels to be picked up by the authorized authenticated customer. Or such a printer could be located on site at a retail store (e.g., 326 of FIG. 3) for labeling items that did not have pre-existing labels/MNFC tags. Such capabilities could be useful, for example, when a household is packing for a move to another location and, upon unpacking, wants or needs to track and locate boxes by specific item level, or for selling items to others, such as directly or through services like eBay®. Also it will be useful to retailers, like brick-and-mortar stores as well as Internet sales entities, such as Amazon.com, who may want to start using MNFC tags before they are widely available for all the benefits they provide both to resellers and new and existing customers.

Additionally, if retailers desire to create new MNFC tags for items that have only barcode tags, they would read the existing barcodes with a handheld hybrid MNFC barcode reader, which would then transmit that data to an MNFC RNID feedstock printer, which would then print a new barcode label with the new embedded MNFC tag RNID, to be applied adjacent to or over the pre-existing barcode label.

Figure 6:
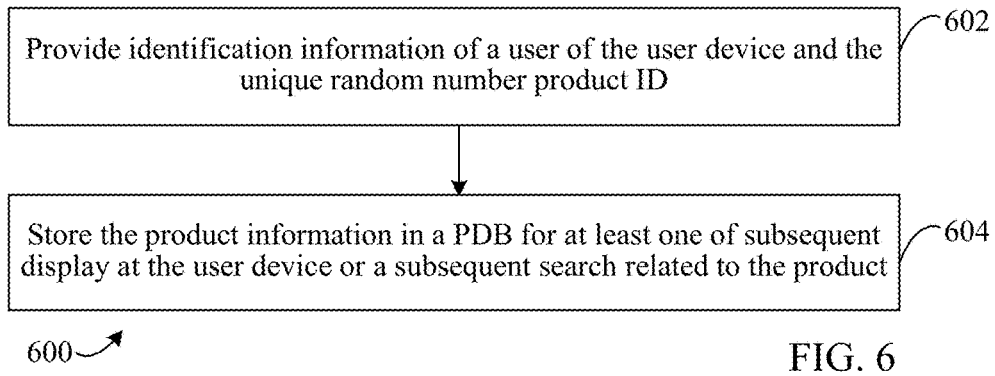
FIG. 6 shows a flowchart for providing robust RFID security and secure targeted information provision by the system of FIG. 5, according to an example embodiment.

Referring also to FIG. 6, a flowchart 600 for improved RFID security and information dissemination utilizing a PASE is shown, according to an embodiment. That is, a user device(s) communicating with a PASE as described herein, along with any respective subcomponents thereof, may be configured to perform their respective functions in accordance with flowchart 600. Flowchart 600 is described as follows with respect to FIG. 5.

Identification information of a user of the user device and the unique random number product ID are provided (502). For instance, user and/or user device information may be provided to PASE 510, alone with a product ID such as a unique random number product ID, as described above. In embodiments, SPR 504 is configured to read the unique random number product ID from an MNFC tag associated with the product.

The product information is stored in a PDB for at least one of subsequent display at the user device or a subsequent search related to the product (504). For example, PASE 510 is configured to store information received from SPR 504 in PDB 514. Information in PDB 514 may be used by PASE 510 for performing one or more functions as described with respect to FIG. 5

Figure 7:
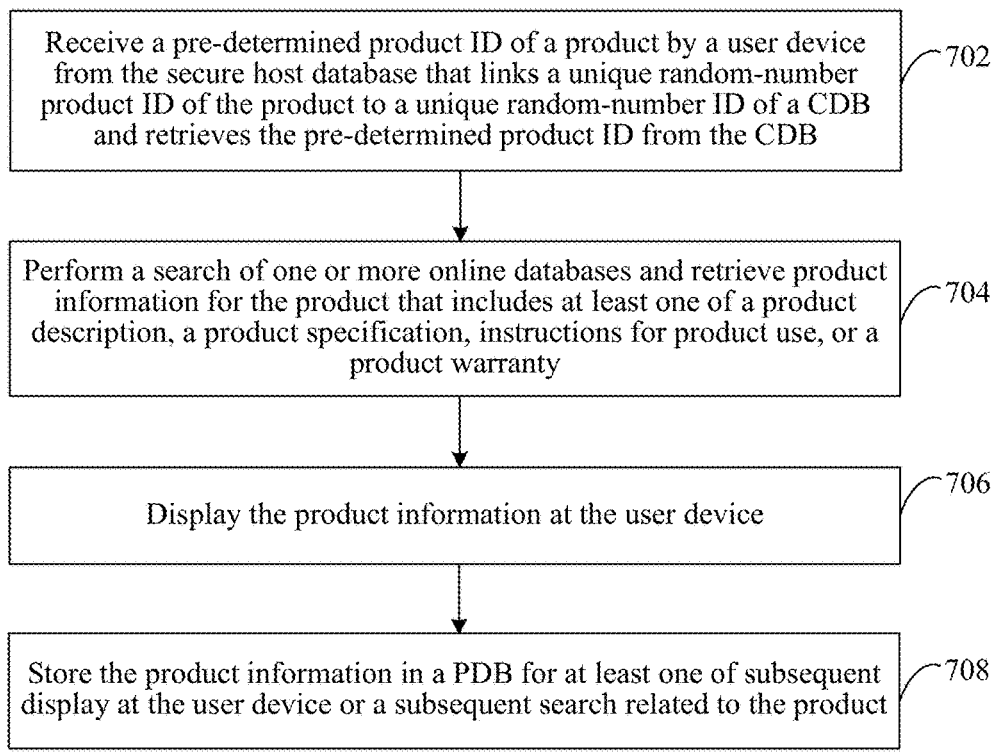
FIG. 7 shows a flowchart for providing robust RFID security and secure targeted information provision by the system of FIG. 5, according to an example embodiment.

Referring also to FIG. 7, a flowchart 700 for improved RFID security and information dissemination utilizing a PASE, is shown, according to an embodiment. That is, a user device(s) communicating with a PASE as described herein, along with any respective subcomponents thereof, may be configured to perform their respective functions in accordance with flowchart 700. Flowchart 700 may be a further embodiment of flowchart 600 of FIG. 6. Flowchart 700 is described as follows with respect to FIG. 5.

A pre-determined product ID of a product is received by a user device from the secure host database that links a unique random-number product ID of the product to a unique random-number ID of a CDB and retrieves the pre-determined product ID from the CDB (702). For instance, a barcode may be received by a user device, e.g., SPR 504, from a host database of host system 502 (MDB, e.g., as an embodiment of secure host database 114 of FIG. 1) that retrieves the barcode form a CDB such as CDB 508 based on a link between the unique random-number product ID of the product and a unique random-number ID of the CDB. The barcode may be provided to a PASE such as PASE 510 that is associated with the user device.

A search of one or more online databases is performed and product information for the product that includes at least one of a product description, a product specification, instructions for product use, or a product warranty is retrieved (704). For example, PASE 510 is configured to search online databases, such as web DB(s) 512 for information related to the product and retrieve the information.

The product information is displayed at the user device (706). For instance, PASE 510 is configured to provide the product information retrieved in (704) to SPR 504, e.g., via a MAPP executing on SPR 504 or by other methods described herein, and SPR 504 is configured to display the information on a display component for viewing by the user.

The product information is stored in a PDB for at least one of subsequent display at the user device or a subsequent search related to the product (708). For example, PASE 510 is configured to provide the product information to PDB 514 for storing and subsequent use as described above.

IV. Further Example Embodiments and Advantages

As noted above, systems and devices may be configured in various ways to perform methods for providing robust RFID security and secure information dissemination by utilizing randomization and identification by proxy or surrogate identifiers. As would be understood by persons of skill in the relevant art(s) having the benefit of this disclosure, according to embodiments, the described and illustrated embodiments may include additional, or fewer, components than those described and illustrated.

The dissemination of information described herein may be provided as text, audio content, video content, multimedia content, pictures/illustrations, and/or the like. For example, user devices and SPRs as described herein may be any type of device having wired/wireless communication capabilities and/or RFID tag reading capabilities, such as those described herein, and also including audio devices and other devices with audio capabilities, optical devices, and/or the like.

Additionally, software embodiments, such as computer-readable medium/storage device embodiments including program instructions to be executed by devices described herein, provide for functions of such devices that were heretofore unrealized in the current state of the art and that provide for improved functionality of such devices and the systems comprising such devices for providing robust RFID security and secure information dissemination.

Furthermore, the techniques and embodiments herein cover any products or items that may be sold by a store, and may also be adapted to services using techniques for MNFC tags in receipts as described herein.

Still further, the exemplary databases described herein are not to be considered limiting as to their respective descriptions. It is contemplated that the described databases may be combined or modularized, and that data and information stored in any given database may be stored in a different database, in addition to, or in lieu thereof.

Additional aspects of the disclosed techniques and embodiments are also contemplated herein. In one aspect, the system is a product information retrieval system where Random Number Identification (RNID) Near Field Communication (NFC) Radio Frequency (RF) tags are applied to bar-coded products where the tags are read by an NFC reader-enabled Smart Phone Reader (SPR) under the control of an SPR application (i.e., an "app") downloaded from a secure site which assigns a unique RNID to the application, designated as RNIDA, and where the application obtains user and user device information required for its interface with the information retrieval system; at least one manufacturing and/or distribution center database that links the RNID's of tagged products, designated as RNIDP, with the product barcodes, and any other product information, including sales coupons, etc., where the database is designated as the special customer database CDB and has a unique RNID, designated as RNIDC; at least one retail store database that links the product barcodes with store-related product information, such as price, store coupons, etc., where the database is designated as SDB and has a unique RNID, designed as RINDS which has associated with it store location in GPS coordinates; one secure database, designated as MDB, which links all the RNIDP's with associated RNIDC's and their CDB access information, all the RNIDS's with their SDB access information, and all the RNIDA's with the associated SPR application user communication information; where when a user enters a store their SPR application finds the RINDS and SDB access information associated with the store's GPS location in the MDB; so when the user reads an NFC tag with their SPR, the application sends the RNIDP to the MDB which uses the RNIDC associated with that RNIDP to send both the RNIDP and RNIDA to the MDC where the barcode and other product information associated with that RNIDP is sent to the user's SPR application, which then sends the barcode and RNIDA to the SDB with the retrieved RINDS, and obtains all store-related product information associated with that barcode, including sales coupons, etc., and displays all thus obtained product information on the user's SPR; where the RNIDA could be retained by both the CDB and SDB for sending targeted advertising to the user.

A system in accordance with another example aspect is described. In one aspect, the system is a system where manufacturers and retail stores can send customized, targeted advertisements to customers based on their shopping history with their NFC SPR's; were when a customer SPR reads a RNIDP tag, their SPR application RNIDA is retained by both the CDB and SDB, which sends the RNIDA along with the advertisements and their RNIDC and RNIDS to the MDB, which sends the advertisements to the customer via internet, text messaging, or direct display on the user SPR, or by any other means based on the customer communication information linked to their RNIDA in the MDB; where the RNIDC and RNIDS could be retained as part of the customer data associated with their RNIDA so that the customer can "pull" advertisements from manufacturers and retail stores.

A system in accordance with yet another example aspect is described. In one aspect, the system is a system where a customer can request, or "pull" special sales offers or incentives customized and targeted to them from manufacturers and retail stores by instructing their SPR application to pull any such sales offers or incentives from manufacturers and retail stores that have sent the customer such advertising in the past, where the retained RNIDC's and RNIDS's in the MDB customer database associated with the customer application RNIDA from past targeted, direct advertising are sent along with the RNIDA to the associated CDBs and SDBs to request special sales coupons, incentives, etc., based on past shopping history. Any such offers are sent to the MDA with the RNIDA, RNIDC and RNIDS, which uses the customer communication information associated with the RNIDA to send the offers on to the customer. The RNIDC and RINDS could be retained as part of the customer data associated with SPR application RNIDA for future such requests.

A computer readable storage device in accordance with still another example aspect is also described. The computer readable storage device comprises a storage medium (i.e., a storage device/hardware storage device) encoded with program instructions that, when executed by a computing device or system, cause the computing device or system to perform a method for providing improved RFID security. In one aspect, program instructions for a Personal Assistant Software Entity (PASE) application reside on the SPR, or reside on a remote server accessed via another application on the SPR. The program instructions, when executed, enhance a user experience, such as when the SPR application retrieves the product barcode from the CDB as described herein. When retrieved, the SPR application is configured to pass that barcode to the PASE, which then would do a web search to access other multiple on-line databases for additional product information, such as but not limited to, product description, specifications, instructions for use, warranties, etc., and presents that to the user in a relevant actionable manner; where product information thus obtained could then be stored in a user Personal Database (PDB) controlled and managed by the PASE for later use and reference by the user, and where the user could use the obtained product information to either buy or not buy the product.

In still yet another aspect, the system is a product information retrieval system where Random Number Identification (RNID) Near Field Communication (NFC) Radio Frequency (RF) tags are applied to barcoded products where the tags are read by an NFC reader-enabled Smart Phone Reader (SPR) under the control of an SPR application (MAPP) downloaded from a secure site database ecosystem (MDB) which assigns a unique RNID to the MAPP, designated as RNIDA, and where the MAPP obtains user and user device information required for its interface with the information retrieval system through the MDB; at least one manufacturing and/or distribution center database that links the RNID's of tagged products, designated as RNIDP, with the product barcodes, and other product information, including sales coupons and other sales incentives, where the database is designated as the special customer database (CDB) and has a unique RNID, designated as RNIDC, where the RNIDP's are linked to the RNIDC's in the MDB, so that when the SPR reads a RNIDP NFC (MNFC) tag the RNIDP and RNIDA are sent to the MDB which retrieves the RNIDC associated with that RNIDP which contains contact information for the CDB so that the RNIDP and RNIDA are sent to the CDB which obtains the product barcode and other product information associated with that RNIDP, which is then sent to the MDB along with the RNIDA, where the MDB uses the RNIDA to obtain the contact information to send the product information to the SPR through the MAPP.

In one embodiment of the product information retrieval system, the RNIDA is retained by the CDB for later use such as sending targeted product advertising to the MAPP through the MDB. In one embodiment of the product information retrieval system, there is at least one retail store database that links the product barcodes with store-related product information, such as price, store coupons, special sales incentives, where the database is designated as SDB and has a unique RNID designated as RNIDS which has associated with it store location in GPS coordinates as well as its street address and SDB access information, and where the MDB contains this information. In one embodiment of the product information retrieval system, when a user enters a store their SPR MAPP finds the RINDS and SDB access information associated with the stores' GPS location in the MDB. In one embodiment of the product information retrieval system, when the MAPP retrieves the RNIDP barcode from a MNFC tag read it sends it to the SDB with the retrieved RINDS and the RNIDA, and obtains all store-related product information associated with that barcode, including sales coupons and other sales incentives and displays it on the user's SPR. In one embodiment of the product information retrieval system, the RNIDA is retained by the SDB for future use such as for merchandise returns and sending targeted product advertisement to the MAPP through the MDB.

In embodiments, one or more of the operations of any flowchart described herein may not be performed. Moreover, operations in addition to or in lieu of any flowchart described herein may be performed. Further, in embodiments, one or more operations of any flowchart described herein may be performed out of order, in an alternate sequence, or partially (or completely) concurrently with each other or with other operations.

The further example embodiments and advantages described in this Section may be applicable to embodiments disclosed in any other Section of this disclosure.

Embodiments and techniques, including methods, described herein may be performed in various ways such as, but not limited to, being implemented in hardware, or hardware combined with one or both of software and firmware. For example, embodiments may be implemented in systems and devices, as well as specifically customized hardware, application specific integrated circuits (ASICs), field programmable gate arrays (FPGAs), digital signal processors (DSPs), etc., electrical circuitry, and/or the like.

V. Example Computer Implementations

System 100 of FIG. 1, system 300 of FIG. 3, and system 600 of FIG. 6, along with any respective components/ subcomponents thereof, and/or any flowcharts, further systems, sub-systems, and/or components disclosed herein may be implemented in hardware (e.g., hardware logic/electrical circuitry), or any combination of hardware with one or both of software (computer program code or instructions configured to be executed in one or more processors or processing devices) and firmware.

Figure 8:
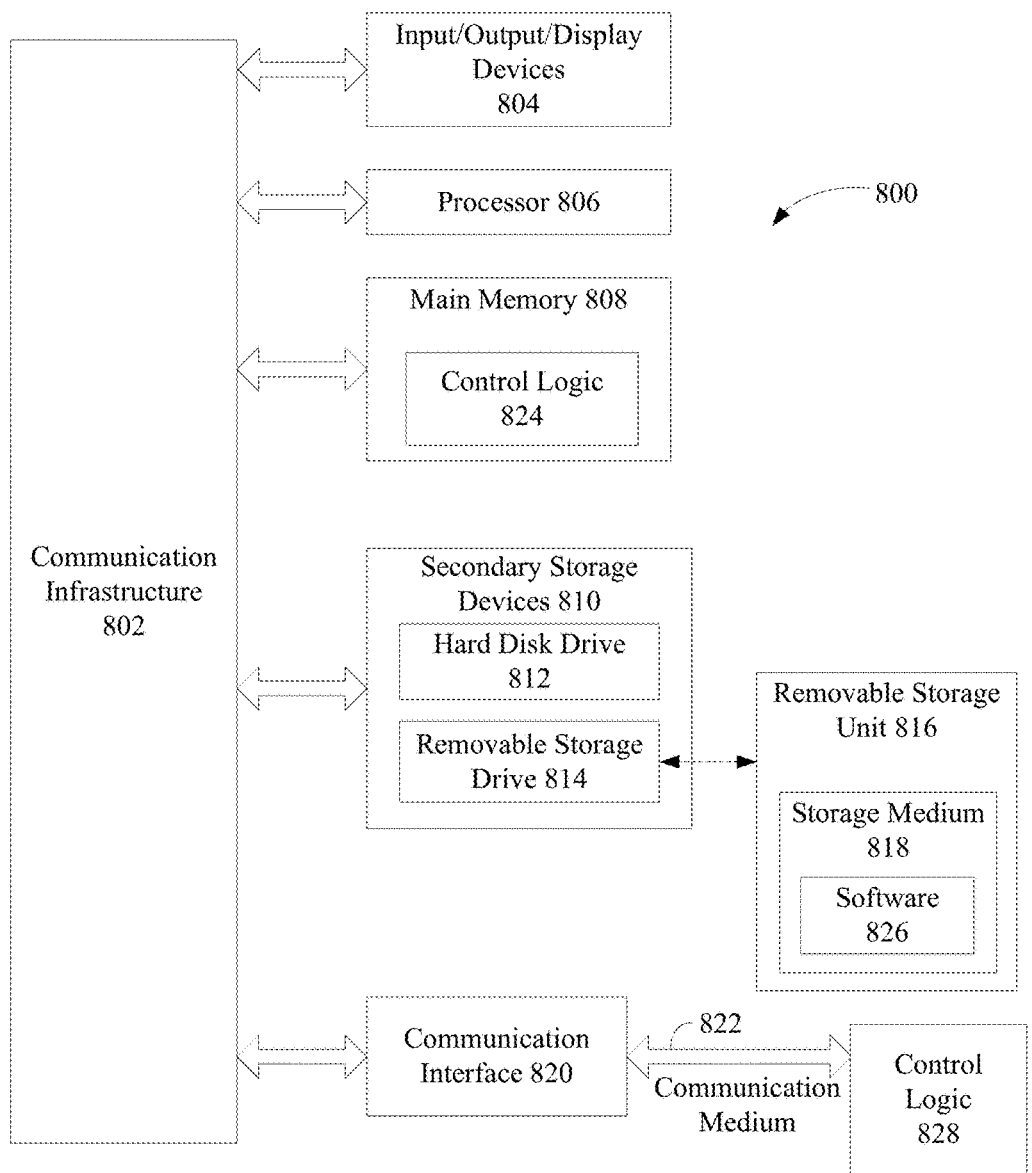
FIG. 8 shows a block diagram of a computing device/system in which the techniques disclosed herein may be performed and the example embodiments herein may be utilized.

The embodiments described herein, including circuitry, devices, systems, methods/processes, and/or apparatuses, may be implemented in or using well known user devices, processing devices, communication devices, servers, and/or, computers, such as a processing device 800 shown in FIG. 8. It should be noted that processing device 800 may represent user devices (e.g., user device(s) 104/304/606), entertainment systems/devices, processing devices, and/or traditional computers in one or more embodiments. For example, system 100 of FIG. 1, system 300 of FIG. 3, and system 600 of FIG. 6, and any of the sub-systems and/or components respectively contained therein and/or associated therewith, may be implemented in or using one or more processing devices 800 and similar computing devices.

Processing device 800 can be any commercially available and well known communication device, processing device, and/or computer capable of performing the functions described herein, such as devices/computers available from International Business Machines®, Apple®, Sun®, HP®, Dell®, Cray®, Samsung®, Nokia®, etc. Processing device 800 may be any type of computer, including a desktop computer, a server, etc., and may be a computing device or system within another device or system.

Processing device 800 includes one or more processors (also called central processing units, or CPUs), such as a processor 806. Processor 806 is connected to a communication infrastructure 802, such as a communication bus. In some embodiments, processor 806 can simultaneously operate multiple computing threads, and in some embodiments, processor 806 may comprise one or more processors.

Processing device 800 also includes a primary or main memory 808, such as random access memory (RAM). Main memory 808 has stored therein control logic 824 (computer software), and data.

Processing device 800 also includes one or more secondary storage devices 810. Secondary storage devices 810 include, for example, a hard disk drive 812 and/or a removable storage device or drive 814, as well as other types of storage devices, such as memory cards and memory sticks. For instance, processing device 800 may include an industry standard interface, such a universal serial bus (USB) interface for interfacing with devices such as a memory stick. Removable storage drive 814 represents a floppy disk drive, a magnetic tape drive, a compact disk drive, an optical storage device, tape backup, etc.

Removable storage drive 814 interacts with a removable storage unit 816. Removable storage unit 816 includes a computer useable or readable storage medium 818 having stored therein computer software 826 (control logic) and/or data. Removable storage unit 816 represents a floppy disk, magnetic tape, compact disk, DVD, optical storage disk, or any other computer data storage device. Removable storage drive 814 reads from and/or writes to removable storage unit 816 in a well-known manner.

Processing device 800 also includes input/output/display devices 804, such as touchscreens, LED and LCD displays, monitors, keyboards, pointing devices, etc.

Processing device 800 further includes a communication or network interface 820. Communication interface 820 enables processing device 800 to communicate with remote devices. For example, communication interface 820 allows processing device 800 to communicate over communication networks or mediums 822 (representing a form of a computer useable or readable medium), such as LANs, WANs, the Internet, etc. Network interface 820 may interface with remote sites or networks via wired or wireless connections.

Control logic 828 may be transmitted to and from processing device 800 via the communication medium 822.

Any apparatus or manufacture comprising a computer useable or readable medium having control logic (software) stored therein is referred to herein as a computer program product or program storage device. This includes, but is not limited to, processing device 800, main memory 808, secondary storage devices 810, and removable storage unit 816. Such computer program products, having control logic stored therein that, when executed by one or more data processing devices, cause such data processing devices to operate as described herein, represent embodiments.

Techniques, including methods, and embodiments described herein may be implemented by hardware (digital and/or analog) or a combination of hardware with one or both of software and/or firmware. Techniques described herein may be implemented by one or more components. Embodiments may comprise computer program products comprising logic (e.g., in the form of program code or software as well as firmware) stored on any computer useable medium, which may be integrated in or separate from other components. Such program code, when executed by one or more processor circuits, causes a device to operate as described herein. Devices in which embodiments may be implemented may include storage, such as storage drives, memory devices, and further types of physical hardware computer-readable storage media. Examples of such computer-readable storage media include, a hard disk, a removable magnetic disk, a removable optical disk, flash memory cards, digital video disks, random access memories (RAMs), read only memories (ROM), and other types of physical hardware storage media. In greater detail, examples of such computer-readable storage media include, but are not limited to, a hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, flash memory cards, digital video discs, RAM devices, ROM devices, and further types of physical hardware storage media. Such computer-readable storage media may, for example, store computer program logic, e.g., program modules, comprising computer executable instructions that, when executed by one or more processor circuits, provide and/or maintain one or more aspects of functionality described herein with reference to the figures, as well as any and all components, capabilities, and functions therein and/or further embodiments described herein.

Such computer-readable storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media and signals transmitted over wired media. Embodiments are also directed to such communication media.

The techniques and embodiments described herein may be implemented as, or in, various types of devices. For instance, embodiments may be included, without limitation, in processing devices (e.g., illustrated in FIG. 8) such as computers and servers, as well as communication systems such as switches, routers, gateways, and/or the like, communication devices such as smart phones, home electronics, gaming consoles, entertainment devices/systems, etc. A device, as defined herein, is a machine or manufacture as defined by 35 U.S.C. § 101. That is, as used herein, the term "device" refers to a machine or other tangible, manufactured object and excludes software and signals. Devices may include digital circuits, analog circuits, or a combination thereof. Devices may include one or more processor circuits (e.g., central processing units (CPUs), processor 806 of FIG. 8), microprocessors, digital signal processors (DSPs), and further types of physical hardware processor circuits) and/or may be implemented with any semiconductor technology in a semiconductor material, including one or more of a Bipolar Junction Transistor (BJT), a heterojunction bipolar transistor (HBT), a metal oxide field effect transistor (MOSFET) device, a metal semiconductor field effect transistor (MESFET) or other transconductor or transistor technology device. Such devices may use the same or alternative configurations other than the configuration illustrated in embodiments presented herein.

VI. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A product information retrieval system comprising:
 one or more host servers configured to:
  in a secure host database, link a unique random-number product identifier (ID) of a near field communication (NFC) high frequency radio frequency (RF) tag (MNFC tag) associated with a product to a unique random-number ID of a customer database (CDB);
  from a user device, over a network, that has a unique random-number device ID and that is configured to read the unique random-number product ID from the MNFC tag via a mobile reader application (MAPP) that comprises a radio-frequency identification (RFID) reader, receive the unique random-number product ID based on an RFID reading of the MNFC tag by the MAPP;
  provide, over the network, the unique random-number product ID and the unique random-number device ID to the CDB, based on a query against the secure host database for the unique random-number ID of the CDB, the unique random-number device ID being unassociated at the CDB with a user of the user device;
  receive information related to the product, a pre-determined product ID that is linked to the unique random-number product ID and includes but is not limited to a barcode, and the unique random-number device ID from the CDB over the network;
  store the information related to the product that is received in the secure host database;
  provide the pre-determined product ID to the MAPP of the user device over the network based on at least the unique random-number device ID of the user device;
  receive, by a personal assistant software entity (PASE) and from the MAPP, the pre-determined product ID;
  query, by the PASE and based on the pre-determined product ID, at least one retail store database (SDB) that links the pre-determined product ID with store-related product information, including one or more of price, store coupons, or special sales incentives, each of the at least one SDB having a unique random-number store ID associated with store information that includes store location GPS coordinates, a store street address, and SDB access information; and
  provide, by the PASE to the MAPP, the store-related product information and the store information for display to the user at the user device.

2. The product information retrieval system of claim 1, wherein the unique random-number device ID is retained by the CDB for subsequently sending targeted product advertising to the user device through the secure host database.

3. The product information retrieval system of claim 1, wherein the user device includes an application through which the targeted product advertising is provided to the user.

4. The product information retrieval system of claim 1, wherein the one or more host servers are configured to:
provide from the secure host database the unique random-number store ID and the SDB access information associated with the GPS location of the store to an application executing on the user device when the user device is in or in proximity to the store location.

5. The product information retrieval system of claim 4, wherein the one or more host servers are configured to:
provide the pre-determined product ID to the application subsequent to the user device reading the MNFC tag to enable the application to provide the pre-determined product ID to the SDB with the retrieved unique random-number store ID and the unique random-number device ID to obtain store-related product information associated with the pre-determined product ID, including at least one of sales coupons and other sales incentives, for display on the user device.

6. The product information retrieval system of claim 5, wherein the one or more host servers are configured to:
provide one or more of product return information and a targeted product advertisement from the SDB, based on storing of the unique random-number device ID in the SDB, to the user device.

7. The product information retrieval system of claim 5, wherein the pre-determined product ID is embodied in a barcode associated with the product.

* * * * *